United States Patent [19]

Rottler

[11] 4,168,826
[45] Sep. 25, 1979

[54] FIXTURE FOR HOLDING V-TYPE ENGINE BLOCKS

[75] Inventor: Donald B. Rottler, Seattle, Wash.

[73] Assignee: Rottler Boring Bar Co., Seattle, Wash.

[21] Appl. No.: 936,844

[22] Filed: Aug. 25, 1978

[51] Int. Cl.² .............................................. B23Q 3/00
[52] U.S. Cl. .................................................... 269/73
[58] Field of Search ...................... 269/68, 71, 73, 287, 269/111, 242

[56] References Cited

U.S. PATENT DOCUMENTS

| | | | |
|---|---|---|---|
| 1,600,835 | 9/1926 | Manley | 269/71 |
| 1,716,718 | 6/1929 | Castagna | 269/242 |
| 1,834,294 | 12/1931 | Spahn | 269/71 |
| 3,719,356 | 3/1973 | Winstead et al. | 269/73 |

*Primary Examiner*—Robert C. Watson
*Attorney, Agent, or Firm*—Seed, Berry, Vernon & Baynham

[57] ABSTRACT

A fixture for holding V-type engine blocks during cylinder honing or other refinishing operations has a stationary stand assembly and a removable clamping assembly which can be applied to an engine block at a location remote from the stand assembly and presents a lifting eye so that the clamping assembly and engine block can be hoisted as a unit, transported and lowered into the stand assembly whereupon the clamping assembly can be selectively pivoted from side to side and locked to vertically present the selected bank of cylinders.

26 Claims, 6 Drawing Figures

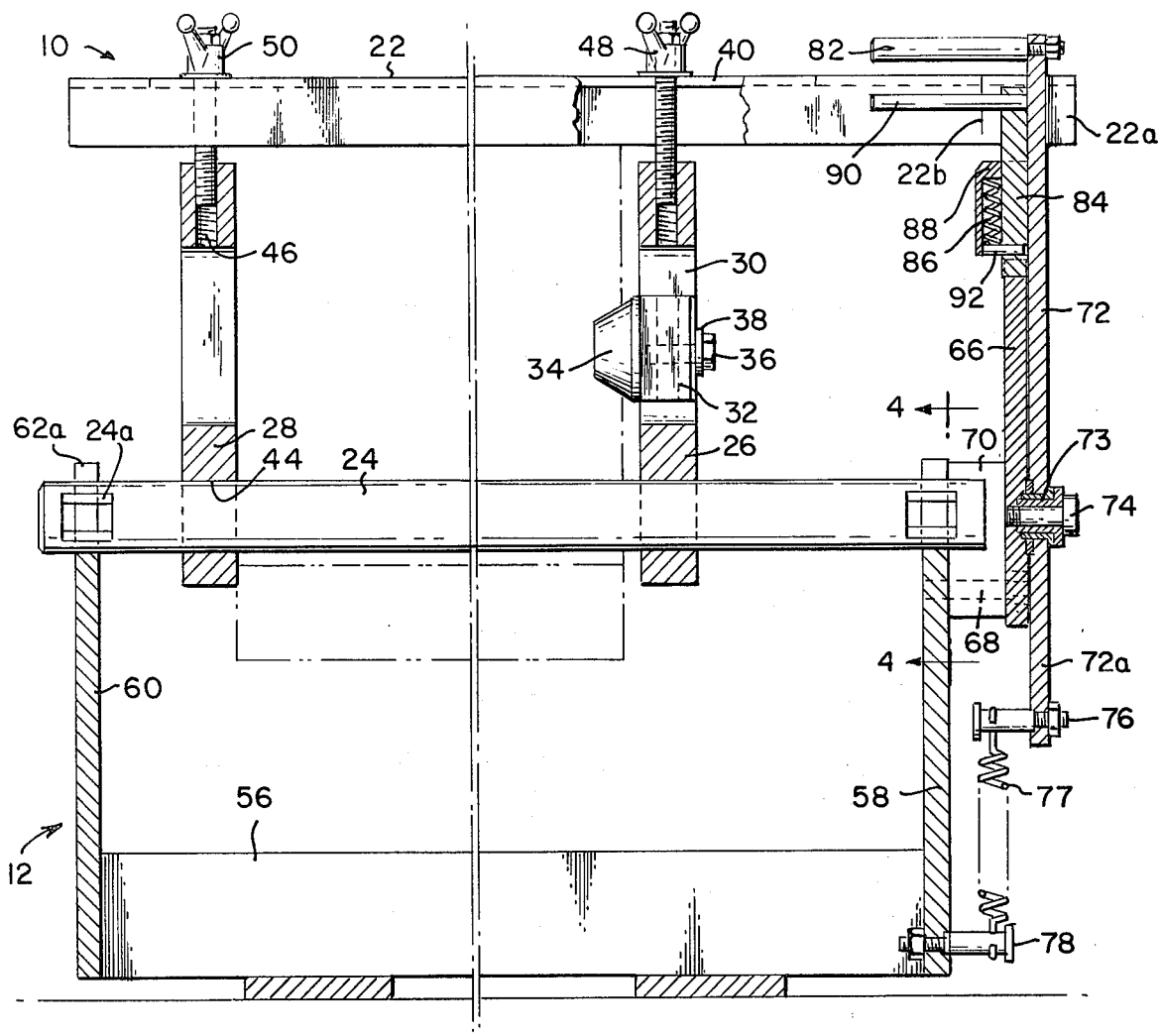
FIG. 2
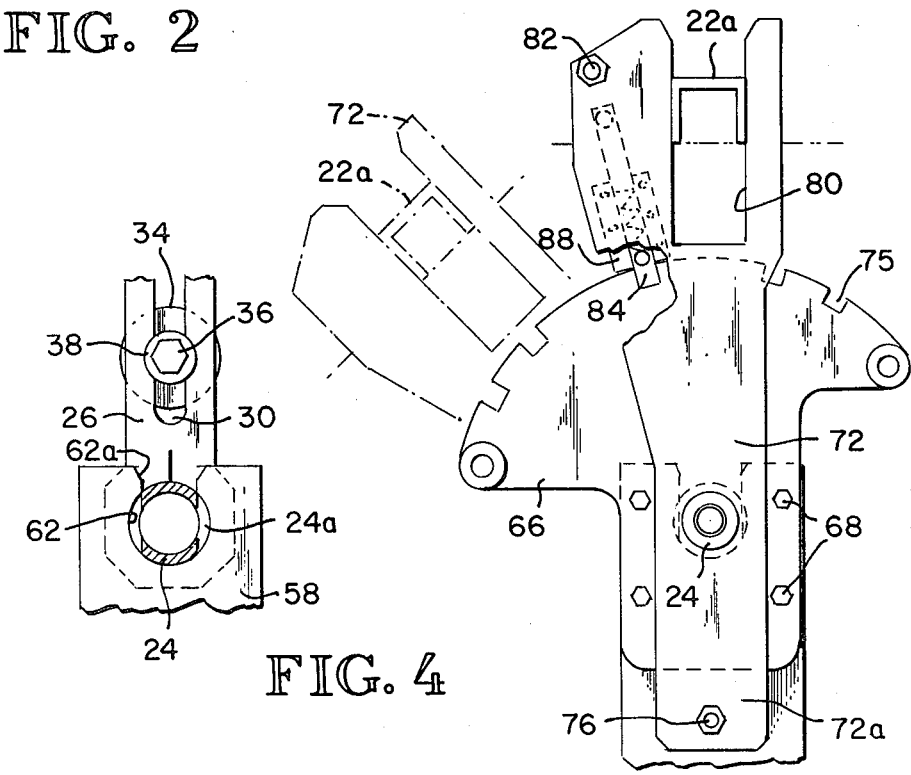
FIG. 4
FIG. 3

FIXTURE FOR HOLDING V-TYPE ENGINE BLOCKS

BACKGROUND OF THE INVENTION

1. Field of the Invention

The present invention relates to fixtures for holding engine blocks in fixed position for refinishing operations such, for example, as the honing of the cylinder walls, and has particular applicability to the holding of engine blocks with a V-type arrangement of cylinder banks.

2. Description of the Prior Art

In the past, holding fixtures for V-type engine blocks have commonly taken the form of a cradle on which the pan rails of the block rests. The block is clamped to the platform and the cradle is tilted from side to side to place the cylinder banks in vertical position. Generally the clamping is accomplished by use of a clamping bar bearing against the inner face of the main bearing caps. Not only does this require that the bearing caps be applied, but requires special adapters or risers to handle those engine blocks of the type in which the bearing caps extend below the plane of the pan rails as distinguished from those in which the bearing caps are above this plane.

The cradle type of fixture necessitates that a lifting eye or bridle be secured at the top of the V-type block to receive the lifting hook of a hoist for maneuvering the block between a storage location and the platform of the fixture. Attachment of a lifting eye or bridle to the block such that the block will remain reasonably level while being transported by the hoist can be surprisingly time consuming.

SUMMARY OF THE INVENTION

The present invention aims to provide an improved fixture for holding a V-type engine block which does not require use of the main bearing caps or the pan rails, and can handle, without special adapters, risers, or other modification, V-type blocks of various sizes, types, shapes, and vee-angles.

The invention also aims to provide an improved such fixture which makes it unnecessary to attach an eye or bridle to the engine block preparatory to hoisting it from storage to clamping position.

Other objects of the invention are to provide an improved such fixture which is of relatively simple and durable construction, is easy to use, and which accurately holds the engine block in position.

In carrying out the foregoing objects the present invention utilizes the upper surface of the main bearings of the engine block, one of the cam shaft bearings, and the top portion of the block between the cylinder banks as engagement surfaces for the fixture. The fixture comprises a stand assembly and a mating block clamping assembly which is fitted onto the block at the block storage location and provides a lifting eye whereby the block clamping assembly and an engine block can be hoisted as a unit and lowered into operating position in the stand assembly. The block clamping assembly comprises upper and lower clamping bars bearing, respectively, against the top of the block and the upper faces of the main bearings. These bars are pulled toward one another by end clamping members one of which carries a positioning cone which fits into one of the cam bearings of the block, and the upper bar has a lifting eye. After the clamping assembly and clamped block as a unit have been lowered onto the stand assembly the ends of the lower clamping bar become trunnions on which the unit can be swung. A counter-balanced swing arm part of the stand assembly interfits with the upper clamping bar so that when the arm is moved from side to side the block pivots on the trunnions so as to alternately present the cylinder banks in vertical position. The swing arm carries a locking pawl which registers with the notches on a stationary notched sector plate for locking the swing arm in selected position.

BRIEF DESCRIPTION OF THE DRAWINGS

In the accompanying drawings:

FIG. 2 is a fragmentary longitudinal vertical sectional view taken as indicated by the line 2—2 in FIG. 1;

FIG. 3 is a fragmentary elevational view taken from the right hand end of the fixture as viewed in FIG. 2;

FIG. 4 is a detail vertical sectional view taken as indicated by line 4—4 in FIG. 2;

DETAILED DESCRIPTION OF THE PREFERRED EMBODIMENTS

Figure 1:
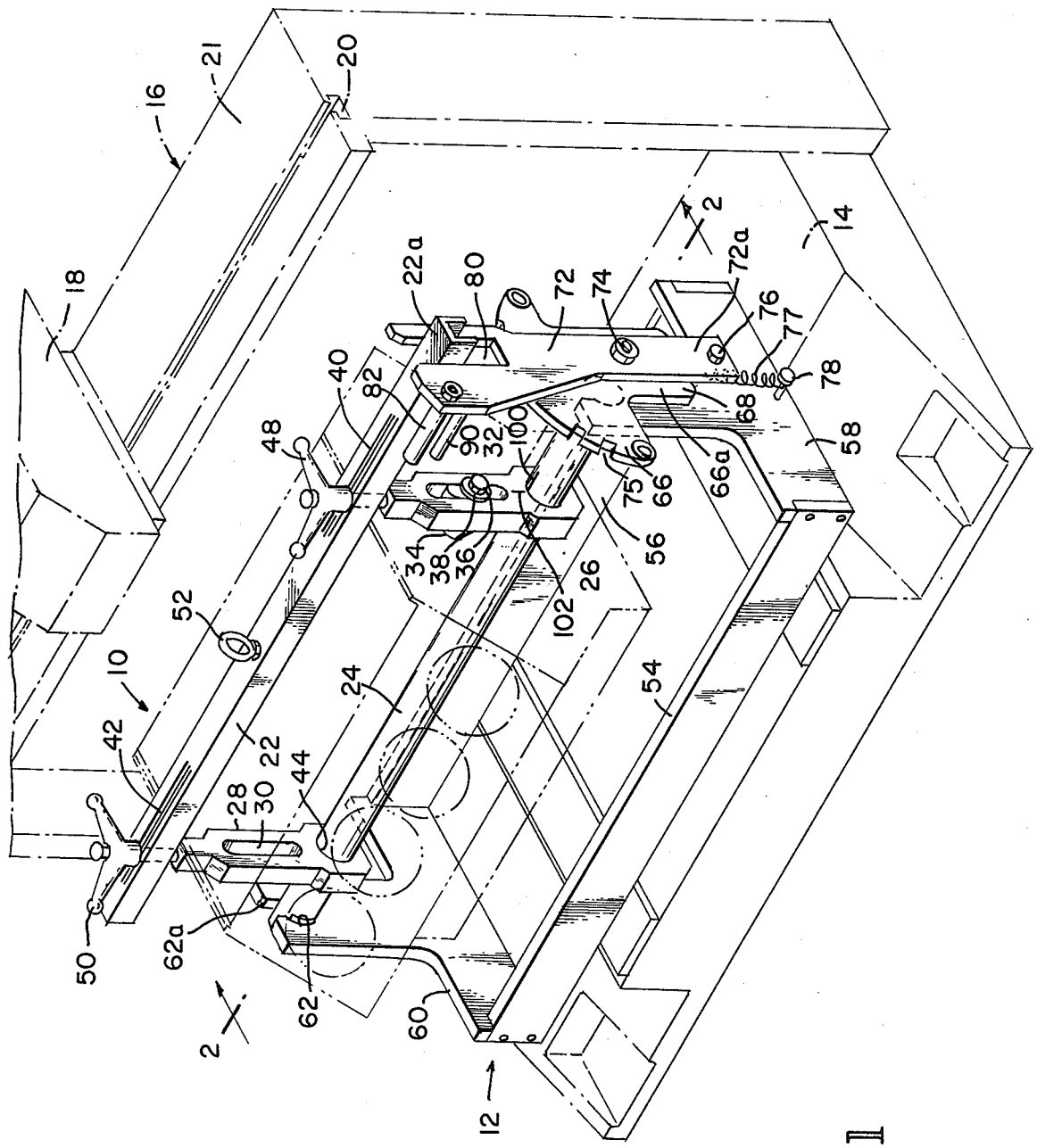
FIG. 1 is a perspective view of a fixture embodying the present invention and shown in operating position.

Referring to the drawings it is seen that the fixture of the present invention comprises an engine block clamping assembly 10 and a stand assembly 12 which interfit during operation of the fixture. The stand assembly 12 may be screw mounted on the lower bed 14 of a honing machine 16 such, for example, as shown in our pending application Ser. No. 911,494, filed June 1, 1978, or on the bed of other refinishing machines. In FIG. 1 numeral 18 indicates the base of the honing head assembly which is slide mounted in track 20 on an upper bed 21 so that the hone can be moved from one cylinder to another of an engine block mounted on the fixture.

The clamping assembly 10 includes upper and lower clamping bars 22, 24 which are held in parallel relation by a pair of clamping legs 26, 28. These legs are formed with an elongated longitudinal slot 30 for a slide block 32 on which a positioning frusto-conical plug 34 is mounted. A clamping screw 36 is threaded into the slide block 32 and bears by its head against a washer 38 so that when the screw 36 is tightened and the washer 38 is responsively forced against the outer face of the leg 26, opposite side portions of the base of the positioning plug 34 are clamped against the inner face of the leg 26. The purpose of the positioning plug 34 is to fit into the cam bearing at one end of the engine block. Hence, the plug 34 may be mounted in either of the legs 26, 28.

It will be noted that the upper clamping bar 22 is of channel configuration and has its central webs slotted to form end slots 40, 42 whereas the lower clamping bar 24 is round and may be tubular. The clamping legs 26, 28 each have a bottom bore 44 whereby the legs are sleeved on the lower clamping bar 24 whereas the upper end portion of each leg 26, 28 is formed with a threaded bore 46 extending from the upper end of the leg to the slot 30 for receiving respective of clamping screws 48, 50 of a size to extend through the slots 40, 42 in the upper clamping bar 22. This arrangement permits the clamping legs 26, 28 to be adjusted along the outer end portions of the clamping bars 22, 24 to accommodate various engine block lengths and permit an engine block to be centered beneath a lifting eye 52 mounted on the upper clamping bar 22 midway between the slots 40, 42 for receiving the lifting hook of a hoist. Preferably the clamping screws 48, 50 are provided with enlarged wing nut type heads for ease in manually tightening the screws.

Continuing to the stand assembly 12, it is seen that it has a bottom box frame formed by a pair of longitudinal side rails 54, 56 bolted at their ends to end supports 58, 60. These supports have an inverted tee configuration and each is formed at its upper end with a bayonet slot 62 positioned with its entry neck 62a facing upwardly for receiving slotted end portions 24a formed in the lower clamping bar 24. The eye of each bayonet slot 26 is of a diameter to accommodate the diameter of the lower clamping bar 24 so that when this bar is turned in the slots 62 after being introduced thereto by having the flats of the slotted portions 24a of the bar aligned with the necks 62a, the bar 24 is locked against vertical movement from the slots 62.

The stand assembly 12 has a stationary sector plate 66 with a depending center leg 66a secured to and spaced endwise from the respective end support 58 by bolts 68 and a pair of vertical spacers 70. These spacers are spaced apart to accommodate the respective end portion of the lower clamping bar 24. The stand assembly 12 also has a swing arm 72 having a bearing 73 journaled on a bolt 74 secured to the sector plate 66 and having its axis aligned with the center of the eyes of the bayonet slots 62. The arc of the sector plate 66 has this same center and is formed with peripheral notches 75. At its lower end the swing arm 72 has an extension 72a provided with an inwardly projecting pin 76 to receive the upper end of a tension counterbalancing spring 77 having its lower end anchored to a pin 78 projecting outwardly from the stand 58.

The upper end of the swing arm 72 is formed with an upwardly opening rectangular slot 80 to receive an extended end portion 22a of the upper clamping bar 22 defined by an index line 22b, and has a locking trigger assembly comprising an inwardly projecting handle 82, a sliding locking pawl 84, a compression return spring 86 beside the pawl 84, a retainer housing 88, and a trigger 90 on the upper end of the pawl spaced beneath the handle 82. The retainer housing 88 is bolted to the inside face of the arm 72, guides the pawl 84, and retains the return spring 86. Retraction of the pawl 84 responsive to upward movement of the trigger 90 compresses the return spring 86 by way of a pin 92 projecting beneath the spring from the pawl 84. When the trigger 90 is released the pawl 84 engages a selected notch 75 in the sector plate 66.

Figure 5:
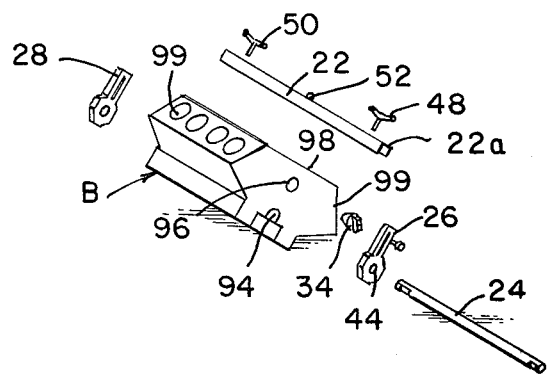
FIG. 5 is a perspective exploded view of the clamping assembly in relation to an engine block.
Figure 6:
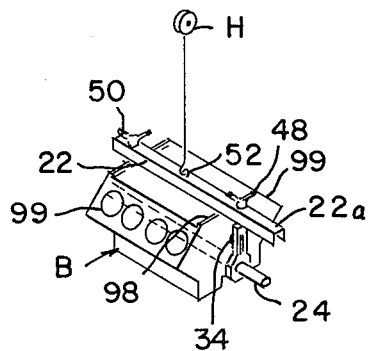
FIG. 6 is a perspective view showing the clamping assembly clamped on an engine block and the resulting unit being lifted by a hoist.

Referring to FIG. 5, a V-type engine block B is shown with its main and cam shaft bearings designated 94 and 96, respectively, and its main bearing caps removed. Normally a V-type block has coplanar flange portions 98 at the ends of the top area of the block between its cylinder banks 99. The present invention utilizes these flange portions 98, the upper surface of the main bearings 94, and one of the end cam bearing 96. To apply the clamping assembly 10 to the engine block, the lower clamping bar 24 is passed endwise beneath the main bearings and the legs 26, 28 are sleeved onto the ends of the bar 24. The positioning plug 34 is adjusted along the leg 26 to align with the cam shaft bearing 96 and then the leg is moved further toward the engine block to insert the plug 34 into the bearing 96.

The upper clamping bar 22 is then centered over the engine block and the clamping screws 48, 50 are passed through the slots 40, 42 in the bar 22 to register with the threaded bores 46 in the legs 26, 28. Before tightening the screws 48, 50 the lower clamping bar 24 is turned so that an index line 100 along the top of the bar registers with a vertical index line 102 on the outer face of the leg 26, and the upper clamping bar 24 is shifted endwise relative to the lower bar 26 such that the index line 22b on the upper bar 22 is aligned with the right hand end (as viewed in FIG. 1) of the lower bar 24. Tightening of the screws 48, 50 then firmly clamps the engine block between the bars 22, 24 with these bars vertically centered between the cylinder banks 99 and engaging, respectively, the upper flange portions 98 of the block and the upper surface of the main bearings 94.

The clamping assembly 10 and engine block B are then a unit which can be lifted by a hoist H, after engagement of the hoist hook with the eye 52, moved to a position above the stand assembly 12 and then lowered to seat the projecting ends of the lower bar as trunnions in the bayonet slots 62 and fit the upper bar extension 22a in the arm slot 80. As the clamping assembly 10 and block are lowered onto the stand assembly 12 the slotted portions 24a of the lower bar 24 pass downwardly through the necks 62a of the bayonet slots 62. Then, when the engine block is pivoted by manipulation of the arm 72 to vertically set the selected bank of cylinders to a vertical position after retraction of the pawl 84 by pulling on the trigger 90, the trigger is released to engage the pawl in the proper notch 75 in the sector plate 66. The notches 75 are arranged in accordance with the usual engine block vee angles experienced. When the lower clamping bar 24 turns in the bayonet slots 62 responsive to swinging of the arm 72 from a vertical position the rounded portions of the bar 24 between the slots 24a become vertically aligned with the neck portion of the bayonet slots 62 and prevent the engine block from moving upwardly while the cylinder honing or other refinishing operation is being performed.

When the clamping assembly 10 is removed from the stand assembly 12, an inline type of engine block can be set on the bed 14 or on transverse rails placed temporarily on the longitudinal rails 54, 56 and clamped in position by clamps resting on the upper bed of the unit 16 and anchored in the T-slot 20 in the manner shown in U.S. Pat. No. 3,273,423.

I claim:

1. A fixture for holding a V-type engine block comprising:
   an upper longitudinal clamping bar adapted to engage the top of a V-type engine block midway between the cylinder banks adjacent the opposite ends of the block and to project endwise beyond said ends by projecting end portions,
   a lower longitudinal clamping bar adapted to engage the upper surface of the main bearings of the engine block and to project by projecting end portions beyond the opposite ends of the block,
   two elongated adjustable upright blamping means adapted to engage said projecting end portions of said upper and lower clamping bars and to pull said clamping bars toward one another to thereby clamp the engine block between said clamping bars,
   tapered positioning means on one of said clamping means for fitting into a cam shaft bearing at one end of the engine block, a stand adapted to detachably receive said clamping bars, clamping means, and a clamped engine block as a unit, and adjustable swing means on said stand for swinging one of said clamping bars relative to the other such as to selectively vertically present the cylinder banks.

2. A fixture according to claim 1 in which at least one of said clamping means is adjustable in position along said clamping bars.

3. A fixture according to claim 1 in which said lower clamping bar is round in cross-section and is smaller in diameter than said main bearings.

4. A fixture according to claim 1 in which said lower clamping bar is round and said stand presents upwardly open journals to receive the projecting end portions of the lower clamping bar when said unit is lowered with said clamping bars in a generally vertical plane, said adjustable swing means being adapted to swing the upper clamping bar relative to the longitudinal center axis of the lower clamping bar.

5. A fixture according to claim 4 in which said journals each have a narrowed upper mouth which is narrower than the diameter of said lower clamping bar, and said projecting end portions of the lower clamping bar are slotted for passing vertically through said mouths when said clamping bars are in a generally vertical plane and to be restricted from passing up through said mouths when said lower clamping bar is turned in the journals responsive to swinging of the upper clamping bar.

6. A fixture according to claim 1 in which the projecting end portions of said upper clamping bar are longitudinally slotted to slidably receive said clamping means for adjustment through and along the upper clamping bar.

7. A fixture according to claim 6 in which said lower clamping bar is round and slidably receives said clamping means for adjustment along the lower clamping bar.

8. A fixture according to claim 6 in which said clamping means each have an upper adjustable clamping screw for extending through said upper clamping bar and engaging the top of said upper clamping bar.

9. A fixture according to claim 4 in which said stand presents a swing arm unit adapted to interfit with one of the projecting end portions of said upper clamping bar when said unit is lowered as recited in claim 4, spring counterbalancing means on the stand for urging said swing arm to a position in which the upper clamping bar is directly above the lower clamping bar, and locking means carried by the stand for selectively locking said swing arms in positions whereat the cylinder banks of the engine block are vertical.

10. A fixture according to claim 9 in which said swing arm unit comprises a sector plate having peripheral notches to receive said locking means.

11. A fixture according to claim 1 in which said clamping means are adjustable along said upper and lower clamping bars, and said upper clamping bar has a central lifting eye for connecting to a hoist.

12. A fixture according to claim 1 in which said tapered positioning means is adjustable in position along a portion of the length of the respective clamping means.

13. A fixture for holding a V-type engine block comprising:

an upper longitudinal clamping bar adapted to engage the top of a V-type engine block midway between the cylinder banks adjacent the opposite ends of the block and to project endwise beyond said block ends;

a lower round longitudinal clamping bar adapted to engage the upper surface of the main bearings of the engine block and to project endwise beyond said block ends; and two adjustable elongated clamping means slidable at one end portion along said lower clamping bar and slidable at the other end portion along and also transversely of said upper clamping bar to position the clamping means relative to the clamping bars, said clamping means being adapted to pull said clamping bars toward one another to thereby clamp the engine block between said clamping bars.

14. A fixture according to claim 13 in which one of said clamping means has a positioning means slidable therealong for fitting into a cam shaft bearing at one end of the engine block.

15. A fixture according to claim 14 in which said positioning means comprises a positioning cone mounted on a slide block which is slidable in a longitudinal slot formed in said one clamping means.

16. A fixture according to claim 15 in which said positioning means includes a clamping screw for holding said slide block against movement from a selected position in said slot.

17. A fixture according to claim 13 in which said upper clamping bar comprises a channel have slotted end portions receiving said clamping means, and an eye on said channel centrally between said slots for receiving a hoist.

18. A fixture according to claim 17 in which said clamping means have adjustable screws projecting through said slots and enlarged heads on said screws for bearing against the top of said channel.

19. A fixture for holding a V-type engine block comprising:

an upper longitudinal clamping bar adapted to engage the top of a V-type engine block midway between the cylinder banks adjacent the opposite ends of the block and to project endwise beyond said block ends, a lower longitudinal clamping bar shaped to engage a minor portion only of the upper surface of the main bearings of the engine block and be laterally centered relative to said main bearings when said clamping bars are pulled toward one another, said lower clamping bar being of a length to project endwise beyond said block ends, and two adjustable clamping means adapted to engage respective projecting end portions of said clamping bars and to pull said clamping bars toward one another, at least one of said clamping means being slidable on said clamping bars and removable from one end of the lower clamping bar.

20. A fixture according to claim 19 in which one of said clamping means has positioning means adjustable therealong for fitting into a cam shaft bearing at one end of the engine block.

21. A fixture according to claim 19 in which said lower clamping bar is adapted to have line contact with said upper surface of the main bearings.

22. A fixture according to claim 21 in which said line contact is a single line contact at the top center of said upper surface.

23. A fixture according to claim 19 in which a stand is arranged and adapted to detachably receive said bars, clamping means, and a clamped engine block as a unit, and adjustable swing means on said stand for swinging one of said clamping bars relative to the other such as to selectively vertically present the cylinder banks.

24. A fixture according to claim 23 in which said stand presents upwardly open journals to receive the projecting end portions of the lower clamping bar when said unit is lowered with said clamping bars in a generally vertical plane, said adjustable swing means being adapted to swing the upper clamping bar relative to the longitudinal center axis of the lower clamping bar.

25. A fixture according to claim 24 in which said journals each have a narrowed upper mouth which is narrower than said lower clamping bar, and said projecting end portions of the lower clamping bar are slotted for passing vertically through said mouths when said clamping bars are in a generally vertical plane and to be restricted from passing up through said mouths when said lower clamping bar is turned in the journals responsive to swinging of the upper clamping bar.

26. A fixture according to claim 19 in which both of said clamping means are slidable along said clamping bars, and a lifting eye mounted on said upper clamping bar adjacent the longitudinal center thereof.

* * * * *